June 21, 1932.  F. G. JONES  1,863,600
TELLURIAN
Filed March 19, 1930  2 Sheets-Sheet 1

Inventor:
F. G. Jones

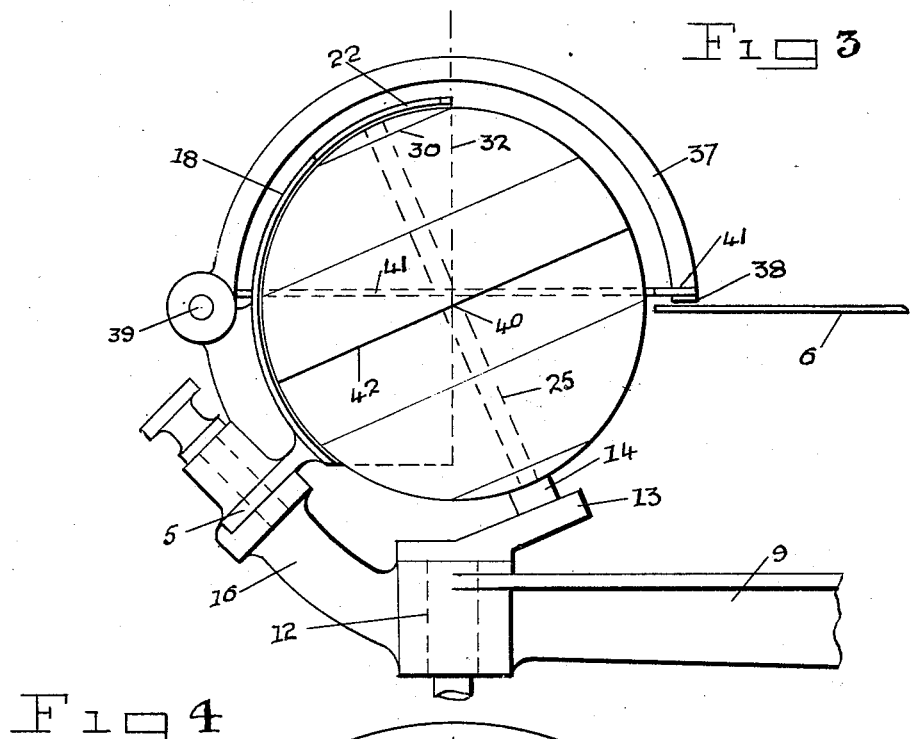
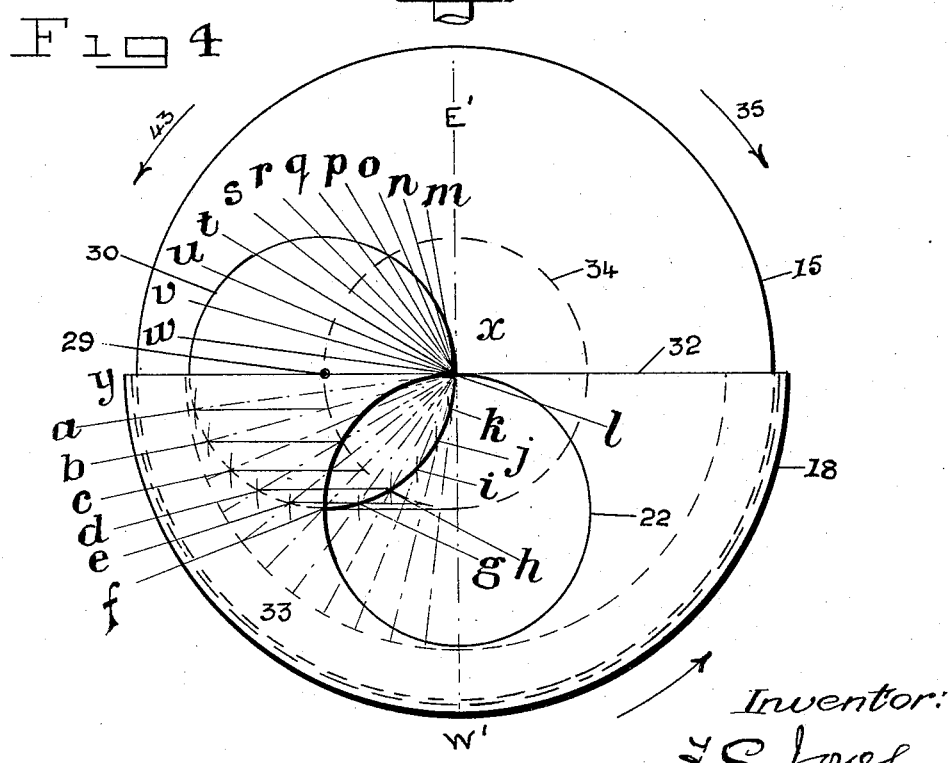

Patented June 21, 1932

1,863,600

UNITED STATES PATENT OFFICE

FREDERICK GEORGE JONES OF CLIFTON, BRISTOL, ENGLAND

TELLURIAN

Application filed March 19, 1930, Serial No. 437,232, and in Great Britain April 15, 1929.

The improved tellurian herein described has particular features of novelty and utility, and illustrates new points connected with the earth's motions. At the same time, the instrument can be used as an ordinary terrestrial globe for geographical purposes.

A specific and important purpose in connection with this instrument is the demonstration of the true cause of the difference between sidereal and solar time. This difference is invariably ascribed in astronomical works to that defection of the sun which results in a daily augmentation of the sun's right ascension. For instance:—"As the right ascension of the sun is increasing, the return of the sun to the meridian when expressed in sidereal time, is later and later each sidereal day; the difference being on an average about four minutes. The interval between two successive transits of the sun's centre across the meridian is four minutes longer than the sidereal day. Thus: if a star came on the meridian today at the same moment as the sun's centre; when the star reached the meridian tomorrow, the sun would have moved away from the place it originally occupied, and its centre would not cross the meridian until about four minutes after the star." (Ball's Elements of Astronomy).

Now, as the centre of the sun relatively to the earth's revolution in its orbit must be regarded as a fixed point; it is to some motion in the earth that augmentation of the sun's right ascension is due; and concomitantly, the difference between sidereal and solar time. As a sidereal day is the interval between two successive transits of any suitable star, and is equivalent to, in round figures, 23 hours, 56 minutes of mean solar time, this represents the actual time of the rotation of the earth on the polar axis. The sun however is regularly late by about four minutes daily in crossing the meridian and as the sun must be regarded as fixed relatively to the earth's motions, this said difference of four minutes—or one degree of arc— must be due to a displacement of the meridian, and therefore of the earth With the instrument herein described, it is possible to demonstrate among other phenomena the following:—

1. That the earth, and consequently, the plane of the meridian rotates in a direction contrary to the daily rotation on the polar axis.

2. That the amount of the said retrograde motion is such as to displace the meridian an angular distance consistent with the four minutes difference between sidereal and solar time. Hence also the degree of daily augmentation of the sun's right ascension.

3. That the plane of the equator is necessarily rotated with the earth on an axis perpendicular to the plane of the ecliptic, causing the variation known as the equation of time due to obliquity.

4. That the said retrograde rotation of the earth is on an axis perpendicular to the plane of the ecliptic, and that a slight variation in the said rotation would effect precession of the equinoxes.

The displacement of the meridian by reverse rotation of the earth is due to the gyroscopic action produced by the earth's diurnal rotation on the polar axis, which induces the plane through the poles to remain constantly parallel to any anterior position of the plane. This condition is invariably referred to as motion of no rotation in contrast with the moon's motion which constantly presents the same face of the moon to the earth; and induces one rotation of the moon on its axis during one revolution about the earth and in the direction of revolution.

As it is demonstrable, however, that no body can revolve about a centre without rotating on an axis perpendicular to the plane of revolution, it follows that the earth rotates on the said axis as does the moon, but the said rotation is corrected by the retrograde rotation before described, and the retrograde rotation is the resultant of the two rotations which are simultaneously in operation. For if the retrograde rotation were non-existent the sun would culminate regularly in 23 hours 56 minutes, and the stars would culminate four minutes earlier than the sun each day. Also, if the direct rotation—as in the case of the moon—were absent, the poles of the earth would each describe a complete circle in space during one revolution of the earth.

The instrument hereinafter described is based upon the foregoing discovery, and greatly simplifies the study of the earth's motions relatively to the sun. With it the student obtains a useful knowledge of the subject which otherwise would necessitate a knowledge of mathematics beyond the average person.

The instrument consists of a base of any suitable material, preferably an iron tripod or stand or sufficient stability. A steel or other metal pivot is fitted to a boss in the centre of the base and a radial arm is mounted rotatably on the said pivot.

A circular graduated disc of transparent or other celluloid, metal or composition is mounted upon the said pivot or on an extension therefrom, and the disc is secured by a milled nut or similar device at the upper end of the pivot. The centre of the said nut or screw at the centre of the disc may represent the position of the sun relatively to any position of the earth on its orbit, and a small electric light may be fitted at this point when desired as an artificial illumination of the globe hereinafter illustrated.

The circular disc is intended to represent the plane of the ecliptic, and is divided round the edge on the upper surface into months and days, and may be divided also into degrees and hours, together with the signs of the zodiac and similar useful information.

The radial arm is provided with a boss at each end. The inner boss is bored to fit on the centre pivot upon which the radial arm rotates, and the outer boss is bored to receive a spindle which is rotatable in the boss, the spindle being parallel with the centre pivot and both perpendicular to the plane of the disc.

The spindle is provided at its upper end with an extension rigidly attached to or integral with the spindle and the said extension carries a pivot rigidly secured to or integral with the extension at a special angle to form the polar axis.

A terrestrial globe to represent the earth is fitted rotatably upon the said axis, and is marked with the conventional circles common to the ordinary globe. The radial arm is extended beyond the outer boss to form a bracket which may be integral with or secured to the radial arm by means of screws. The bracket is arranged to support adjustably in an enlargement upon the bracket, a hollow semi-spherical night shade which partly envelops the globe, half the globe being constantly within the shade with sufficient clearness for the globe to rotate without contact with the shade.

The night shade is made of any suitable material such as aluminium, celluloid or other composition, and is provided with a projection by which it is adjustably attached to the bracket upon the radial arm. The shade is secured by means of a screw or screws which may be extended to form a handle for operating the radial arm. Alternatively the shade may be fitted to a meridian circle upon the radial arm as hereinafter shown.

An important feature of the night shade is a circular aperture in the upper side of the shade, with the said aperture disposed immediately over and coincident in plan with the Arctic circle on the globe when the globe is assumed at the winter solstice. This circular aperture is hereinafter described in detail.

The spindle which rotates in the outer boss on the radial arm is provided with a crosshead rigidly fitted to the lower end of the spindle below the boss. The crosshead is adjusted and secured by a nut and setscrew, and is extended laterally to form handles for the purpose of operating the spindle and to manipulate the radial arm on the centre pivot. A pointer is secured to or integrally formed upon the crosshead at right angles to the laterally extended handles for the purpose of preserving the constant direction of the polar axis.

A graduated meridian or quadrant may be fitted above the night shade, and may be secured to or hinged upon the bracket extension from the radial arm so that these parts may be temporarily removed when the globe is used geographically, or the graduated meridian can be used without the night shade.

The spindle which carries the globe may be operated by toothed gearing from the centre pivot, but the crosshead adopted is of special utility, as with it the spindle may be rotated without moving the radial arm. Having reference to the accompanying drawings:—

Fig. 3 indicates an alternative method of supporting the night shade combined with a meridian quadrant rigidly fitted or hinged upon the bracket extension from the radial arm.

Fig. 4 is a diagram illustrating the use of the night shade.

Figure 1:
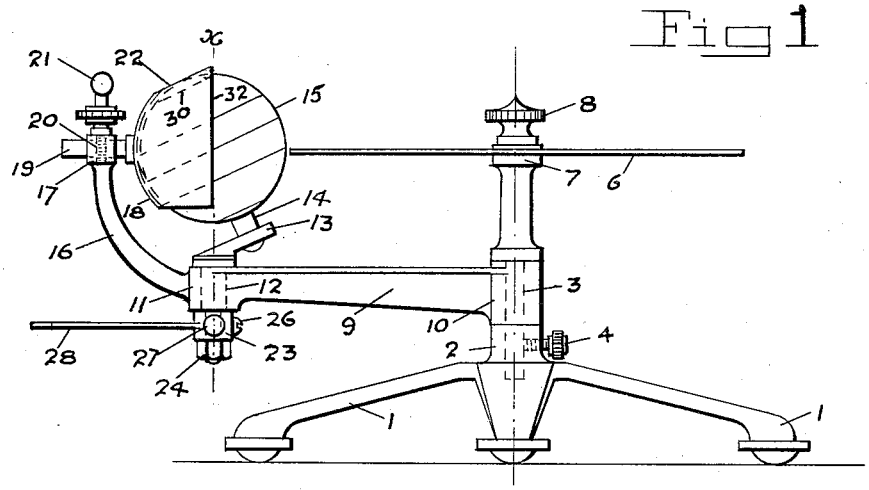
Fig. 1 is a side elevation of the instrument.

In Fig. 1 the base 1 has a boss 2 containing a pivot 3. The pivot 3 is secured in the boss 2 by means of a setscrew 4 or similar device. The celluloid disc 6 representing the plane of the ecliptic, is supported by a collar 7 on the pivot 4 extended, and is secured adjustably by the milled nut 8.

The radial arm 9 has a boss 10 turning freely upon the pivot 3 and a second boss 11 at the outer end of the radial arm. The spindle 12 is rotatable in the boss 11 and the extension 13 carries the polar pivot 14 on which the globe 15 is mounted rotatably. The bracket 16 with enlargement 17 supports the semi-spherical night shade 18 by means of the projection 19 attached to or formed upon the night shade. The said projection is secured to the bracket at 17 by means of the screw 20 extended to form a handle 21 for operating the radial arm 9 on the pivot 3.

A circular aperture 22 is formed at the upper side of the shade 18 and the said aperture may be regarded as divided into 24 hours and parts to form a time circle as hereinafter shown in greater detail. The said circular aperture in the position shown coincides with the arctic circle 30 but in other positions the two circles intersect for a special purpose.

The cross head 23 is fitted rigidly upon the spindle 12 by a bored boss which is passed over the lower end of the spindle and secured by a nut 24 and setscrew 26 or similar simple means. The crosshead is extended at 27 seen more clearly in Fig. 2 to form handles for operating the spindle 12 and is fitted with a pointer 28 indicating the direction of the polar axis.

Figure 2:
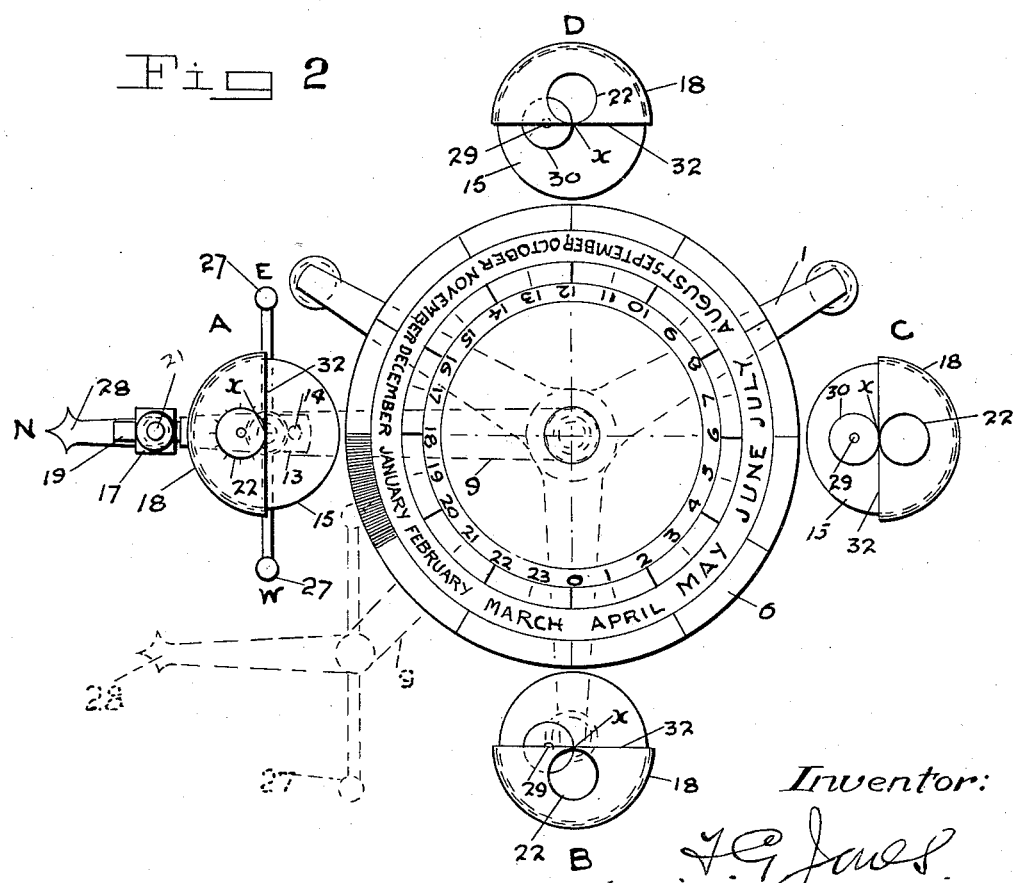
Fig. 2 is a plan relatively to Fig. 1 showing the globe in different positions.

Fig. 2 shows the instrument in plan with the parts as shown in Fig. 1 similarly numbered. The handle 21 operates the radial arm 9 in a circle round the centre pivot 3, and the globe 15 is moved into any position in the circle such as A, B, C or D, corresponding with the winter and summer solstices and the spring and autumn equinoxes. When rotating the radial arm 9 by means of the handles 27 on the crosshead, the said handles are kept parallel to their initial position at A so that the pointer 28 is constantly pointing to the north as assumed at N and with it the polar axis 29.

In position B—the spring equinox—90 degrees from the position A it is important to note that the circle 22 on the night shade 18 has moved together with the radial arm through 90 degrees, and the said circle no longer coincides with the Arctic circle 30 as at A where the pole 29 is at the centre of the circle 22.

At the position C—the summer solstice—180 degrees from the position A, the circle 22 on the night shade 18 is completely removed from the Arctic circle 30 which is here totally outside the flat edge 32 of the night shade, the dividing line between night and day. It is obvious that in this position, the globe rotating on the polar axis 29 has continuous sun within the Arctic circle for a period of 24 hours.

In position D—the autumn equinox—the circle 22 again intersects the Arctic circle 30 in a quadrant as in position B (reversed) and on returning to the initial position A the two circles again coincide.

It is understood that in any intermediate positions not shown, the said circles intersect in variable progression according to the distance traversed by the glove in its orbit.

The Arctic circle is divided as a 24 hour circle, and the circular aperture 22 may be similarly divided. The intersections of the two circles during one revolution of the globe, register in hours and parts the difference between sidereal and solar time on any day in the year.

Fig. 3 is an alternative arrangement in which the night shade 18 is fitted to a graduated quadrant or meridian 37. The said meridian is hinged or rigidly mounted upon the bracket 5, and extension 16 on the radial arm 9. The shade 18, which is here shown in section vertically, is attached to the meridian as at 39, by lugs and screws, forming a hinged joint. The globe 15 is mounted on the polar pivot 14 as before described. A graduated horizontal circle 41, shown by dotted lines, is fitted to the meridian 37 and is concentric with the globe 15. When the radial arm 9 is turned upon the centre pivot (4, Fig. 1) the meridian at its outer extremity 38 will traverse the day or other divisions marked upon the margin of the disc 6. When the globe 15 is rotated by the spindle 12, the meridian line 25, upon the globe and intersecting the Equator at the point 40, will indicate the divisions on the graduated ring 41. The said divisions may be in degrees, or in hours and parts and are read in conjunction with the divisions indicated on the disc 6 by the meridian pointer at 38. The said readings indicate the amount of angular motion in the globe 15 on the axis compared with the angular motion of the globe in its revolution about the centre pivot when the radial arm is turned upon the said pivot, and may be regarded as a check on similar readings on the smaller circle 22 on the night shade 18 hereinafter described.

Fig. 4 is a diagram showing the intersections of the two circles as described, in greater detail. The parts shown are assumed to be in the position B, Fig. 2. The night shade 18 with the circular aperture 22 is understood to be rotating in the direction of the arrow 36 on the axis X which is perpendicular to the plane of the disc 6 (Fig. 2). The globe 15 with the Arctic circle 30 is understood to be rotating on the polar axis 29 in the direction of the arrow 43. Also it is demonstrable that the globe 15 is rotating on the axis X in the direction of the arrow 35, that is to say the newly discovered rotation hereinbefore referred to. The diagram is drawn to show the changes taking place between the position of the globe at A, Fig. 2, and the position B in the same figure. The flat edge 32 of the shade 18 at A is in the direction E. W. and this direction is indicated at E'. W'. in the diagram Fig. 4, where the shade 18 has turned through 90 degrees. During the change of position from A to B (Fig. 2) the edge 32 of the shade 18 assumes the directions $xm$, $xn$, $xo$, $xp$, $xq$, $xr$, $xs$, $xt$, $xu$, $xv$,

*xw* and *xy*. These points are hour divisions on the Arctic circle 30 and the flat edge 32 of the shade 18 cutting the circle in Y registers 12 hours of sunlight within the Arctic circle. As this corresponds to the position B in Fig. 2, the spring equinox, the remaining 12 hours are within the night shade 18, as indicated by the dotted lines 33 and the day and night are equal throughout the world.

It will be seen that as the night shade 18 continues to rotate on the axis X, the edge 32 of the shade, when at the position C, Fig. 2, will have passed over the dotted lines 33, Fig. 4, registering a further 12 hours, and the Arctic circle will be totally without the night shade 18.

At D, Fig. 2—the autumn equinox—the shade 18 assumes the position shown and again registers 12 hours day and 12 hours night as would the diagram Fig. 4 if reversed. This condition arises twice in one revolution of the globe, when the edge 32 of the night shade equally divides the Arctic circle 30.

At A, Fig. 2, the shade 18 reassumes the initial position at the winter solstice, and the arctic circle 30 coincides again with the circular aperture 22 registering 24 hours night as the Arctic circle is totally within the night shade. All the intermediate variations of day and night will be understood.

Independently of the rotations of the globe 15 and of the shade 18 on the axis X, the normal daily rotations of the earth on the polar axis are indicated by the arrow 43, Fig. 4.

The purpose of the circular aperture 22 in the night shade 18 is as follows:—

During the rotation of the shade on the axis X, the circular aperture 22—which coincides at A, Fig. 2, with the Arctic circle—continues to intersect the Arctic circle at all intermediate positions except at C, where the two circles are tangential.

The diagram Fig. 4 shows the points of intersection of the circles 22 and 30 from zero, where the circles coincide. The first hour intersection is at *a*, continuing at *b, c, d, e* and *f* for 6 hours, where the circle 22 is shown as at the position B, (Fig. 2). The arcs of intersection are shown as described by a radii from equally spaced successive centres on the circle 34 which indicate the locus of the polar axis 29 relatively to the circle 22 throughout a complete revolution of the globe. When the motion of the shade 18 is imagined continued as to position C, (Fig. 2), the circle 22 will continue to intersect the Arctic circle 30 in the points *g, h, i, j, k* and *l*, or six-hour points as between the positions B and C (Fig. 2). The said hours represent the difference between sidereal and solar time, or the amount lost by the sun from the spring equinox to the summer solstice when compared with sidereal time. This amount also is equal to the augmentation of the sun's right ascension as shown on June 21 on the hour circle 44 Fig. 2. It will be understood from the diagram, that if the shade 18 continues to complete its rotation on the axis X, the circle 22 will continue to intersect the hour points beyond *l*, at *m, n* and *o*, and the edge 32, of the shade 18, will continue to precede the intersections of circles as *xm, xn, xo*, and beyond as before described, indicating the hours of light or darkness within the Arctic circle.

It may be pointed out that the arc intercepted by any radius vector, such as *xy*, is twice the angular quantity intercepted by the circle 22 as at *f*. The arc *yf*=90 degrees. The arc *xy*=180 degrees.

The circle 22 on the night shade 18 may be a circular aperture cut in the shade, or the circle may be represented by a circle of holes twenty-four in number to represent hours, so that the motion of the Arctic circle past the centre of each hole is equivalent to the intersection of the circles as before described. In the case of a shade being made from transparent celluloid, the circle 22 is engraved upon the shade together with the hour divisions.

It will be seen from the foregoing description and the diagram Fig. 4 that the base of the earth's shadow as a plane, represented by the edge 32 of the shade 18 is constantly rotating in space on an axis as at X which is perpendicular to the plane of the ecliptic. That the said plane of the earth's shadow intersects the Arctic circle on the earth in regular succession and registers by the said intersections in hours and parts the period of night or day subsisting within the Arctic circle on any day in the year.

Also that an imaginary circle in the earth's shadow tangent to the plane of the base, as represented by the circle 22 on the shade 18, will intersect the Arctic circle on the earth in regular succession and register by the said intersections in hours and parts, the period by which the sun is later than sidereal time; usually reckoned as from the spring equinox.

As the said intersections are equal also in angular measurement to the sun's augmentation in right ascension during any period, the same intersections may be regarded as registering simultaneously the difference between sidereal and solar time and the sun's increase in right ascension.

In addition to the ordinary scholastic instrument herein described, an instrument of great accuracy may be made for scientific purposes, with all the essential planes and circles machine divided on metal with vernier and microscopic readings. The plane of the ecliptic may be mounted eccentrically on the central pivot to conform with the earth's actual motion, and generally an instrument of extreme precision may be made for a close investigation of the motions described.

I claim:—

1. In a tellurian, a globe having graduations thereon, and a night shade having graduations thereon adapted to cooperate with the graduations on said globe to indicate the difference between sidereal and solar time at different times of the year.

2. In a tellurian, a globe having graduations thereon, a night shade having graduations thereon adapted to cooperate with the graduations on said globe to indicate the difference between sidereal and solar time at different times of the year, and supporting means rotatably securing said globe within said night shade.

3. In a tellurian adapted to indicate the difference between sidereal and solar time at different times of the year, a disk having months of the year indicated thereon, a night shade rigidly secured to an arm for rotation about an axis normal to the plane of the disk and in proximity thereto, a globe rotatably supported within said night shade and between the same and the disk, graduations on said globe and graduations on said disk and means for positioning said globe on the rotatable support whereby the globe may be properly positioned with respect to said night shade for any desired time of the year as indicated on the disk and the intersections of the graduations on the globe and the night shade may be read to indicate the difference between sidereal and solar time for the desired time of the year.

4. In a tellurian, a graduated disk having times of the year indicated thereon, a semispherical hollow night shade mounted for revolution about said disk, a globe rotatably mounted within said night shade, graduations on said globe corresponding to the Arctic circle and hours of the day, and means for positioning the globe within said night shade to correspond to positions of the earth at times of the year indicated on the graduated disk whereby the hours of light within the Arctic circle may be read from the intersection of the semi-spherical night shade and the graduations on the globe for the time of the year to which the globe has been positioned as indicated on the graduated disk.

5. In a tellurian, a graduated disk corresponding to the plane of the ecliptic, a globe having graduations thereon for cooperation with the graduations on the disk, a night shade at least partially enclosing said globe, graduations on the night shade for cooperation with the graduations on the globe, an arm rigidly secured to said night shade and pivoted about an axis normal to and concentric with the disk, and rotatable supporting means on said arm positioning the globe within the night shade, whereby the globe may be properly positioned within the night shade to correspond to the position of the earth on its inclined axis at any desired position on the ecliptic as indicated on the graduated disk.

6. In a tellurian, means representing the plane of the ecliptic, a globe mounted for revolution about said ecliptic representing means, graduations on said globe and indicating means for cooperation with said graduations whereby the difference between sidereal and solar time at different times of the year, corresponding to respective positions of the globe in the plane of the ecliptic may be read.

7. In a tellurian, a graduated disk, means for rotatably supporting said globe, and a pivotal support for supporting said last mentioned means whereby the globe may be rotated so that the graduations on the globe cooperate with the graduations on the disk to indicate the difference between sidereal and solar time at different times of the year.

Dated this 25th day of November 1929.

F. G. JONES.